O. J. HARTFIELD.
RADIATOR.
APPLICATION FILED DEC. 27, 1915.
1,203,731.
Patented Nov. 7, 1916.
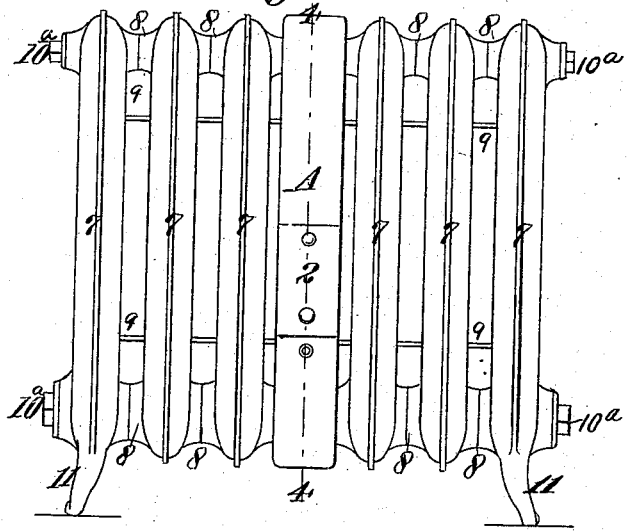
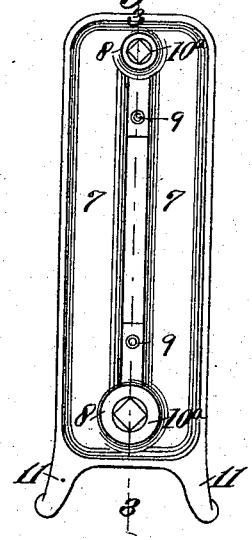
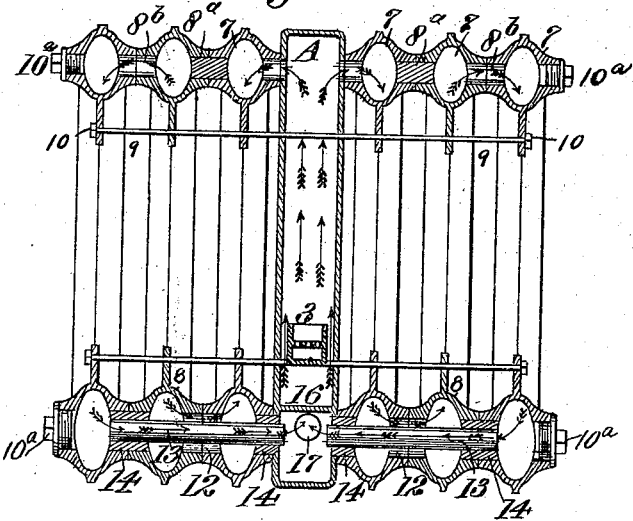
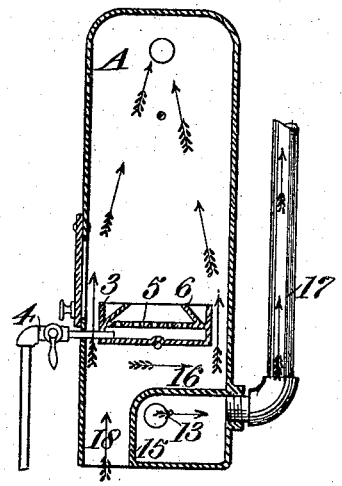
WITNESSES:
Charles Pickles
Thos. Castberg
INVENTOR
Otto J. Hartfield.
BY Strong & Townsend
ATTORNEYS

UNITED STATES PATENT OFFICE.

OTTO J. HARTFIELD, OF OAKLAND, CALIFORNIA, ASSIGNOR TO HELEN A. HARTFIELD, OF LOS ANGELES, CALIFORNIA.

RADIATOR.

1,203,731.  Specification of Letters Patent.  Patented Nov. 7, 1916.

Application filed December 27, 1915. Serial No. 68,725.

*To all whom it may concern:*

Be it known that I, OTTO J. HARTFIELD, a citizen of the United States, residing at Oakland, in the county of Alameda and State of California, have invented new and useful Improvements in Radiators, of which the following is a specification.

This invention relates to an apparatus designed to heat the atmosphere and circulate and radiate the heat produced from a central source, so as to distribute it evenly throughout the space to be heated.

It comprises details of construction which will be more fully explained by reference to the accompanying drawings, in which—

Figure 1 is a front elevation of my radiator. Fig. 2 is an end view, showing one section. Fig. 3 is a section, taken on the line 3—3 of Fig. 2. Fig. 4 is a transverse section on the line 4—4 of Fig. 1.

As shown in the drawings, A is a central chamber, which may be rectangular or of any suitable form and may be provided with a removable door, as at 2, which allows access to the heater. In the present case I have shown a gas heater 3 having a means for introducing gas, as at 4, a distributing screen 5 and sides 6 which may be convergent so as to direct the heat upwardly through the chamber A.

Upon each side of the chamber A are a series of rectangular, tubular castings 7. These all have projecting nipples at the top and bottom, as shown at 8, and the ends of these nipples may be fixed or otherwise formed so that they will abut against each other, and as many of them may be thus abutted upon each side of the chamber A as will furnish the required amount of heating surface. They may be conveniently held together by bolts 9 extending through the sections at the top and bottom and firmly secured together by nuts 10 at the opposite ends. Thus constructed it forms a structure, the outer sections 7 of which may have extended legs 11 to support it upon the floor.

The interior connections are as follows: From the upper part of the heating chamber A passages extend horizontally into the interior of the radiator sections 7, as shown in Fig. 3. From this point the heat passing around and down the sides of the section 7 arrives at the lower end and there is transferred through the passage 12, which is of considerable diameter so as to allow the heat to pass freely. Thence it passes into the lower portion of the next section 7 and up to the top. The passage at this point is closed as at 8ᵃ so that there is no communication between the top of the first and second sections 7; and the heat thence passes through the open section 8ᵇ and into the upper part of the next section 7. Passing downward through this section, the heat is directed into a pipe 13 which extends through the passages at the lower end, which passages are sealed, as shown at 14, with the exception of the passage 12, as previously described. The opening in this is large enough to allow a free passage of the heated air through it and around the pipe 13. There may be as many of these sections as is desired, arranged in the manner here described and sufficient to produce the proper amount of radiating surface. The outer ends of the passages are all closed by screw plugs or other equivalent devices 10ᵃ.

The lower part of the chamber A has a partition in it, consisting of a vertical wall 15 and a horizontal wall 16, which form a rectangular space at one side of this lower portion, and into this rectangular space the pipe 13 discharges. Connected with one side of this chamber is a discharge pipe 17, through which the gases, now considerably cooled by their passage through the sections, will escape. At one side of this chamber, formed by the partitions 15 and 16, is an opening 18 through which fresh air is drawn and so directed as to pass through and around the heater 3.

It will be seen that by this construction a supply of fresh air is continually delivered into the lower part of the apparatus and by the various return passages is caused to pass through a considerable number of radiating chambers until, at the end, it will have lost a considerable portion of its heat and being delivered into the exit pipe 17 there will be sufficient draft created therethrough to keep up a circulation within the apparatus and provide a clean and sufficient heat for the room or space in which the apparatus is installed.

Having thus described my invention, what I claim and desire to secure by Letters Patent is—

1. An air heater and radiator, consisting of a vertical, rectangular chamber, a heater located in the lower part of the chamber, heat radiating sections fixed in series at each side of the first-named chamber and having connecting passages at the top and alternately with the top and bottom of the following radiator sections, a chamber below the heater of the central chamber, tubular pipes extending from the outer radiator sections to said chamber, and a connected draft producing flue.

2. In an air heating and radiating apparatus of the character described, a vertically disposed central chamber and radiator sections located at each side having connecting passages alternately at the top and bottom, a heater located in the lower part of the central chamber, compartments below the heater, pipes connecting the exterior radiator sections with one of said compartments, an air inlet through the other compartment to the heater, and a draft flue connecting with the first named compartment.

In testimony whereof I have hereunto set my hand in the presence of two subscribing witnesses.

OTTO J. HARTFIELD.

Witnesses:
CHAS. H. HACKETT,
W. M. CRAWFORD.

Copies of this patent may be obtained for five cents each, by addressing the "Commissioner of Patents, Washington, D. C."